(12) United States Patent
Chen et al.

(10) Patent No.: US 7,326,456 B2
(45) Date of Patent: Feb. 5, 2008

(54) LOW DENSITY ORIENTED STRAND BOARD

(75) Inventors: Liheng Chen, Edmonton (CA); Robert W. F. Wellwood, Edmonton (CA)

(73) Assignee: Alberta Research Council Inc., Edmonton, Alberta (CA)

( * ) Notice: Subject to any disclaimer, the term of this patent is extended or adjusted under 35 U.S.C. 154(b) by 60 days.

(21) Appl. No.: 10/485,949

(22) PCT Filed: Aug. 8, 2002

(86) PCT No.: PCT/CA02/01240

§ 371 (c)(1),
(2), (4) Date: Jun. 3, 2004

(87) PCT Pub. No.: WO03/013811

PCT Pub. Date: Feb. 20, 2003

(65) Prior Publication Data

US 2004/0209102 A1    Oct. 21, 2004

(30) Foreign Application Priority Data

Aug. 8, 2001    (CA) .................................... 2354909

(51) Int. Cl.
B32B 21/06    (2006.01)

(52) U.S. Cl. .................. 428/100; 428/101; 428/109; 428/113; 428/537.1; 428/535; 428/541; 264/109; 264/297; 264/319; 156/276

(58) Field of Classification Search ............... 428/100, 428/101, 109, 113, 537.1, 535, 541; 264/109, 264/297, 319; 156/276
See application file for complete search history.

(56) References Cited

U.S. PATENT DOCUMENTS

| | | | | |
|---|---|---|---|---|
| 3,061,878 A | * | 11/1962 | Chapman | 425/339 |
| 3,164,511 A | * | 1/1965 | Elmendorf | 428/110 |
| 5,047,280 A | * | 9/1991 | Bach | 428/182 |
| 5,538,676 A | * | 7/1996 | Bielfeldt | 264/109 |
| 5,733,396 A | * | 3/1998 | Gerhardt et al. | 156/62.2 |
| 6,767,490 B2 | * | 7/2004 | Sean et al. | 264/109 |

FOREIGN PATENT DOCUMENTS

| | | |
|---|---|---|
| DE | 19603892 | 8/1996 |
| DE | 10037508 | 2/2002 |
| JP | 58063434 | 4/1983 |
| JP | 08188996 | 7/1996 |
| WO | WO 99/24233 | 5/1999 |

OTHER PUBLICATIONS

Wu, Zhang-kang, et al. "Review on Studies for Vertical Density Profile of Wood Composites", Manual of Tsinghua Tongfang Optical Disc. Co. Ltd.—1995-2006.

* cited by examiner

*Primary Examiner*—Leszek Kiliman
(74) *Attorney, Agent, or Firm*—Bennett Jones LLP

(57) ABSTRACT

A low density oriented strand board has an average density of less than about 1.5 times the density of wood species used in the board and a homogenous vertical density profile. Low density OSB may be formed by preheating the wood finish prior to pressing, controlling the moisture content such that the core layer has a higher moisture content than the face layers, or a combination of pre-heating and moisture content control.

9 Claims, 6 Drawing Sheets

US 7,326,456 B2

LOW DENSITY ORIENTED STRAND BOARD

FIELD OF THE INVENTION

The present invention relates to low density oriented strand board and novel methods for making low density oriented strand board.

BACKGROUND OF THE INVENTION

The oriented strand board ("OSB") industry emerged in the late 1970s and soon became a major competitor to the plywood industry. By the year 2000, OSB had already captured more than half of the North American structural panel market. Although many efforts have been made by the OSB industry to improve their products' properties, several OSB properties, such as the strength-to-weight ratio, homogeneous density profile, and dimensional stability, still compare unfavourably with plywood.

OSBs are manufactured from wooden strands combined with a thermosetting resin and consolidated together under heat and pressure in a hot press. Typically, an OSB panel comprises a middle core layer and two outer face layers. In order to develop adhesive bonds between the wooden furnish, it is necessary to produce adequate contact between wood and resin, and raise the temperature to cure the resin. Currently, common commercial pressing operations use a closing time (press platens ramp to the final position) in the range of 25 to 90 seconds. With these durations, the temperature in the middle layer (core) of the OSB is still below the point necessary to soften the wooden furnish and cure the resin in the core layer. Additional time is necessary for the heat to transfer into the core to soften the wooden furnish and cure the resin. Because of this temperature gradient, strands in the surface and bottom layers of the mat that contacted to the hot platens first will be softer than those in the middle layer. When the pressure is applied to the mat, the outside layers compress more than the middle core layer. As a result, commercial OSBs typically have an "M" shape vertical density profile through the vertical direction (higher in the surface and bottom, and lower in the core) as shown in the prior art FIGS. 1 and 2.

FIG. 1 is the vertical density profile of a commercial $^{23}/_{32}$" OSB made with Southern Pine wood furnish. Although the average density of this panel is 44 lb/ft$^3$, the density of the surface and bottom layers can be as high as 57 lb/ft$^3$ but the core layer is only 37 lb/ft$^3$. FIG. 2 is another commercial $^{23}/_{32}$" OSB made with Aspen which average panel density is 35 lb/ft$^3$. The highest density in the outside layer is 45 lb/ft$^3$ and the core layer is only 29 lb/ft$^3$. Both panels have shown the typical "M" shapes in their vertical density profiles—very high density in the surface and bottom but a much lower density in the core. There is currently no known technique to overcome this issue and produce OSBs having a flatter vertical density profile. At the present time, the only way to make the adequate contact for the consolidation is to use a much higher average density to raise the density in the core layer. In addition, when these panels are exposed to water, they would have very high thickness swelling due to the high compression ratio in the surface and bottom layers.

Because of the uneven heating and resin setting nature of a convention of OSB process, the moisture content is regulated such that the moisture content of the outer face layers is significantly higher than the moisture content of the core layer. This is done to promote heat transfer into the core layer by heat conduction.

The average density of conventional OSB is between 35 to 45 lb/ft$^3$ depending on the wood species used. When OSB manufacturers attempt to make a lower density OSB below this range, the first problem they will confront would be a very lower density core with a porous appearance, therefore, causing problems of low strength properties.

Therefore, there is a need in the art for a method of making low density OSB having a relatively homogenous vertical density profile which mitigates the difficulties in the prior art.

SUMMARY OF THE INVENTION

The present invention is directed to methods of making low density OSB and the resulting low density OSB panels. Accordingly, in one aspect of the invention, the invention comprises a method of forming a low density OSB product, comprising the steps of:
  (a) combining wood strands with thermosetting resin;
  (b) preheating the wood strands-resin mixture; and
  (c) pressing and heating the preheated wood strands-resin mixture until the resin sets to form OSB.

In another aspect of the invention, the invention comprises a method of forming a low density OSB product including a core layer and two outer face layers, comprising the step of controlling the moisture content of the core layer to be about equal to or higher than the moisture content of the outer face layers prior to pressing. Preferably, the moisture content of the core layer is between about 10% to about 30% while the moisture content of the outer face layers is below about 10%. More preferably, the moisture content of the core layer is about 20% while the moisture content of the outer face layers is about 8%.

In another aspect of the invention, the invention comprises a low density OSB having a homogenous vertical density profile.

BRIEF DESCRIPTION OF THE DRAWINGS

The invention will now be described by way of an exemplary embodiment with reference to the accompanying simplified, diagrammatic, not-to-scale drawings. In the drawings.

DETAILED DESCRIPTION OF THE INVENTION

The present invention provides a method of making a low density OSB product by preheating the wood strands prior to consolidation. As used herein, "low density" refers to OSB having an average density of less than about 1.5 times higher than the density of the wood used in the OSB, and preferably less than about 1.4 times higher. With typical wood species used in OSB production, "low density" may refer to OSB products having an average density of less than about 40 lb/ft$^3$, preferably less than about 35 lb/ft$^3$, and more preferably around 30 lb/ft$^3$. For example, the density of aspen log is typically in the range of 22 to 25 lb/ft$^3$, therefore a preferred "low density" aspen OSB product may have an average density of less than about 35 lb/ft$^3$ (25×1.4). The density of shortleaf Southern Pine is about 32 lb/ft$^3$, therefore a preferred "low density" shortleaf Southern Pine OSB product may have an average density of less than about 45 lb/ft$^3$ (25×1.4).

Figure 4:
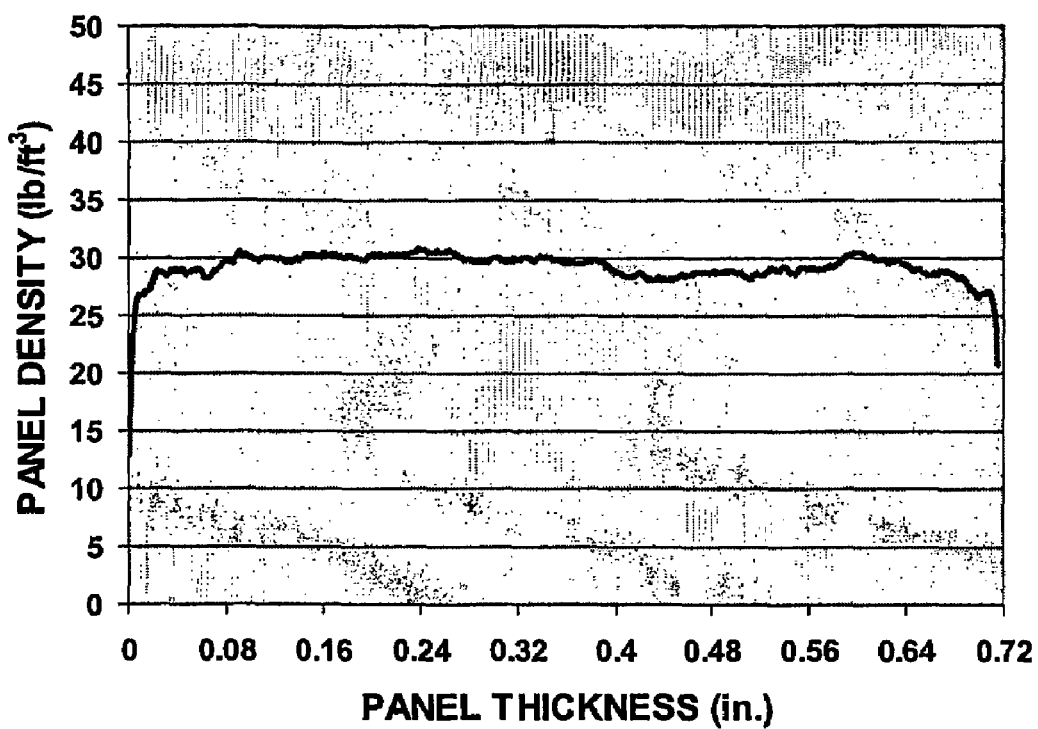
FIG. 4 is a vertical density profile of a low density OSB made with long Aspen strands.
Figure 5:
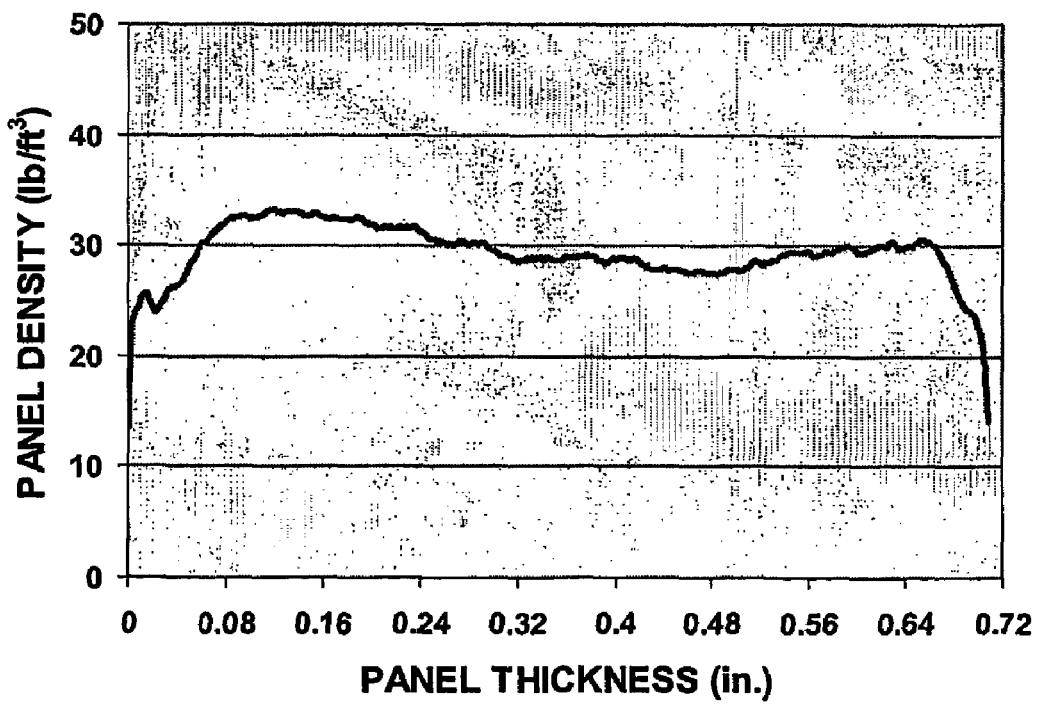
FIG. 5 is a vertical density profile of a low density OSB made with short Aspen strands.
Figure 6:
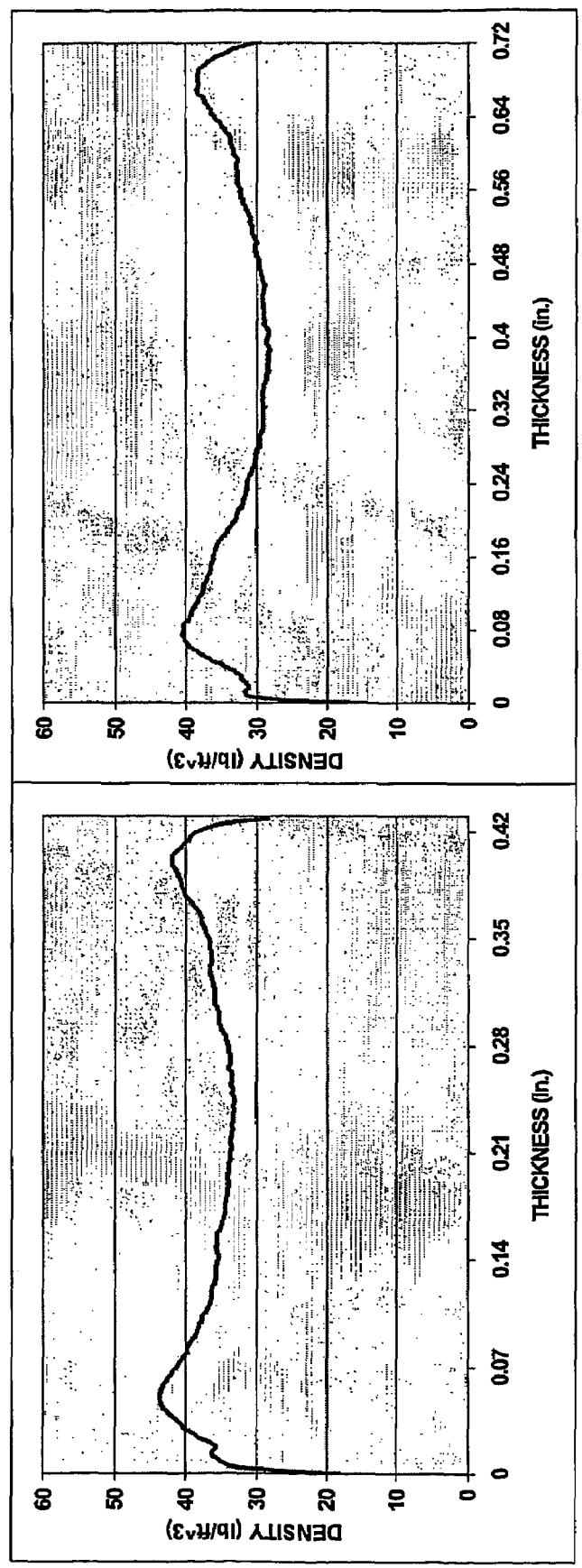
FIG. 6 is a vertical density profile of two low density OSBs of different thicknesses made with moisture content controlled wood furnish and without preheating.

As used herein, "homogenous vertical density profile" refers to a density profile similar to that shown in FIGS. 4, 5 and 6, wherein the lowest core density is at least about 75% of the highest surface density. Preferably, the lowest core density is greater than about 80% of the highest surface density. More preferably, it is greater than about 85% and most preferably it is greater than about 90%.

A feature of the present invention is a pre-heating procedure used with a conventional OSB production line to raise the temperature of OSB strands before they are consolidated into the final product. The range of the pre-heating temperature may be from about 35° C. up to the onset temperature of the particular adhesive or resin used in the product. After the pre-heating procedure, the softened strands in the core layer will be easier to densify. With this invention, OSB manufacturers no longer need to use a higher average panel density to raise the core density. As the result, the relatively high density in the surface and core can be reduced or even eliminated.

The preheating process can be applied by any heat source, such as by microwave, radio frequency (RF) or high frequency irradiation, infrared irradiation, hot air, or steam, to bring up the strands' temperature. Any method of heat transfer, such as conduction, convection or radiation may be used. The preheating process can be applied in any location in the production line before the final consolidation, such as heating the strands during the blending process, heating the mat during the mat formation, heating the mat after the mat formation but before the consolidation, or heating the mat before the final stage of the consolidation. Because the target of the pre-heating step are the strands in the core layer, the heating area of the OSB strands or mat can be either the entire mat or only the core zone.

This invention adds the pre-heating process to current production lines in OSB mills for making low density OSBs but still with performances able to pass standard requirements. In addition to a significant reduction in density without significant loss of strength and integrity, the OSBs made in accordance with this invention may also have a homogeneous vertical density profile as compared to conventional OSB. Because of its low compression ratio in the surface and bottom layers, OSB products made with this invention also have an excellent dimensional stability and low thickness swelling.

In an alternative embodiment, the moisture content of the core layer and face layers may be manipulated to produce OSB products with a homogenous vertical density profile, either with or without the preheating step described herein. Preferably, the moisture content of the core layer is maintained between about 10% to about 30% while the moisture content of the outer face layers is below about 10%. More preferably, the moisture content of the core layer is between about 18% to about 22%, while the moisture content of the outer face layers is about 8%. The mat with the controlled moisture contents is then pressed. Lower ramp pressures than conventional OSB pressing cycles may be used because the softer core. Because of the lower density, the mechanism of the heat transfer during the pressing cycle in the low density OSB is mainly dependent on heat convection rather than the heat conduction as in the conventional OSBs. In spite of the higher moisture content in the core layer than in the surface layers, the rate of the heat transfer into the core layer during the pressing cycle is higher. As a result, the vertical density profile is more homogenous than with conventional prior art OSB methods.

In preferred embodiments, a method of the present invention may combine the preheating steps and the moisture content control steps referred to above. Heating by microwave or RF irradiation works particularly well with higher moisture content in the core layer as the increased moisture causes greater heat production in the core layer upon irradiation.

EXAMPLES

The following examples are intended to illustrate the claimed invention, without limiting the invention to the specific elements described in the examples.

Example 1

Aspen strands having a length within a range of 5-5.75", a width within a range of 0.5-1", and a thickness within a range of 0.015"-0.020" were used as the raw material. Seven weight percent of MDI (diphenylmethane diisocyanate) was applied as the binder to these strands when they tumble with the blender by means of a spinning disc. After blending, the furnish was formed into a mat similar to conventional OSB 3-layer orientation. The mat was pre-heated by microwave irradiation for 28 seconds until the core temperature in the mat was raised to 53° C. The pre-heated mat then was pressed with the hydraulic press at a temperature of 200° C. for a period of 6 minutes. The thickness of the panel was 0.72 inches and the average density was targetted at 30 lb/ft$^3$.

Figure 1:
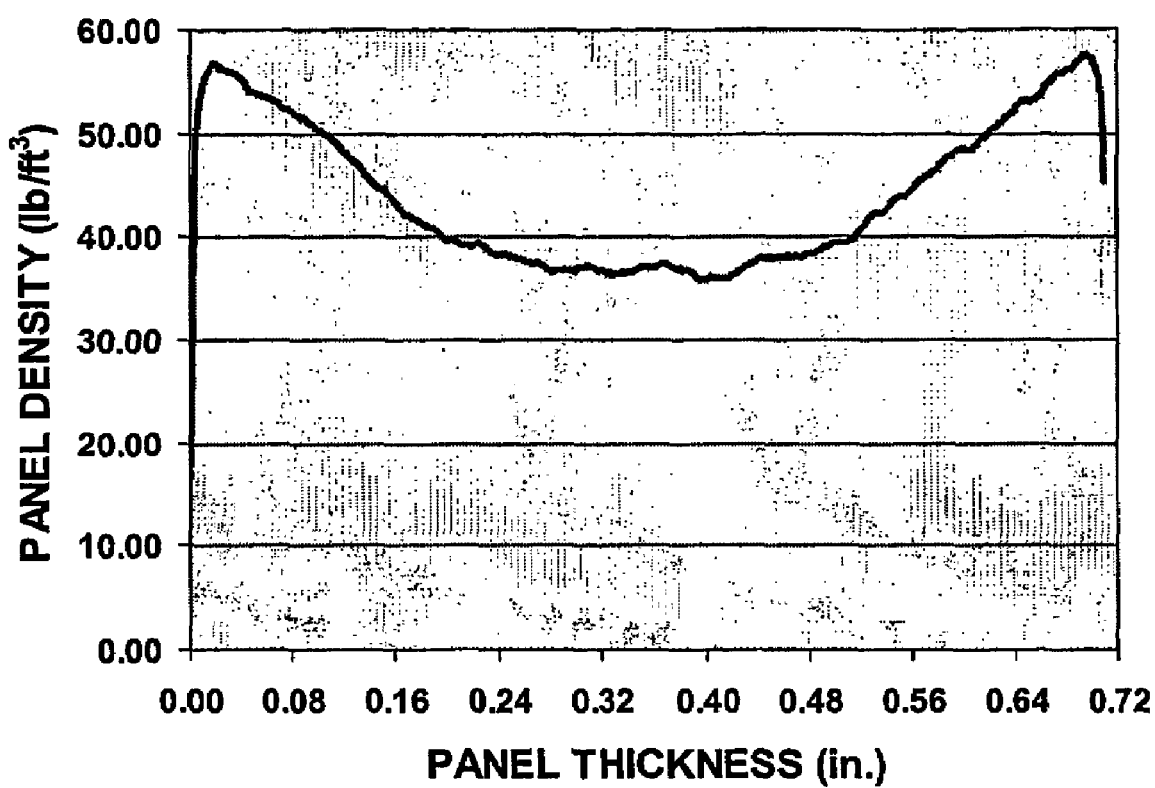
FIG. 1 is a vertical density profile of prior art commercial OSB made with Southern Pine.
Figure 2:
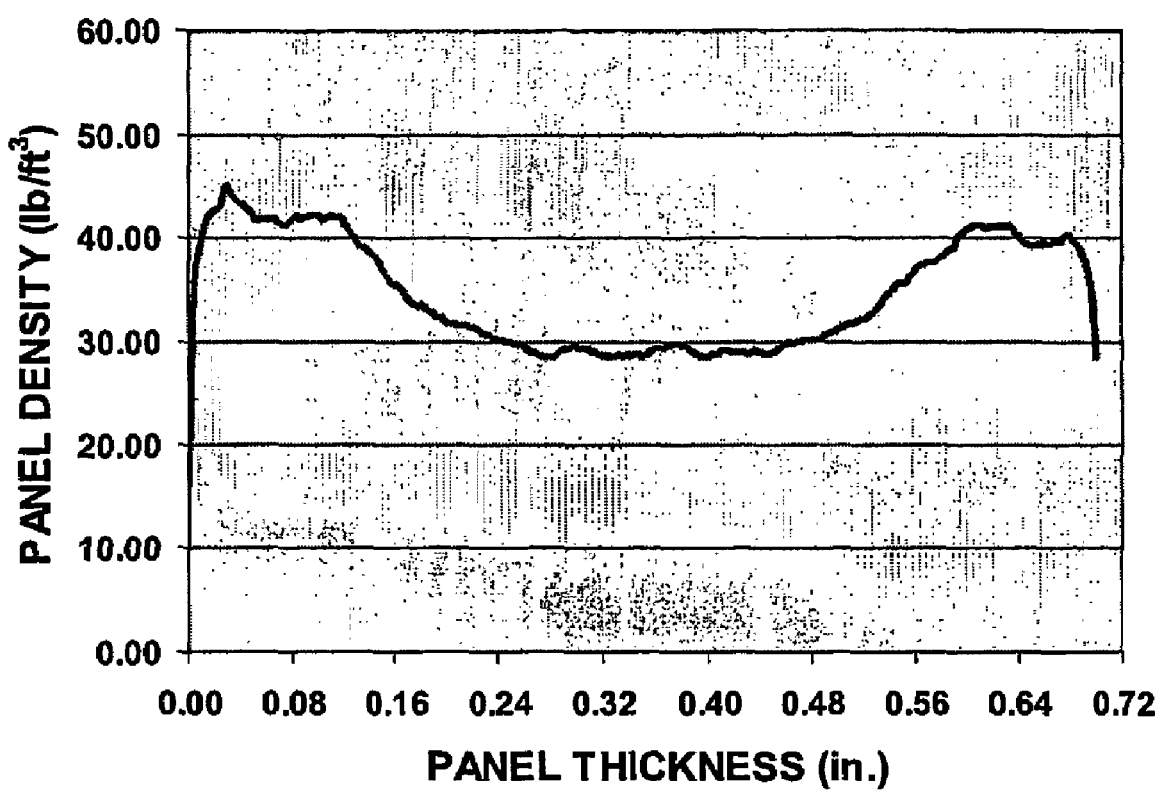
FIG. 2 is a vertical density profile of prior art commercial OSB made with Aspen.
Figure 3:
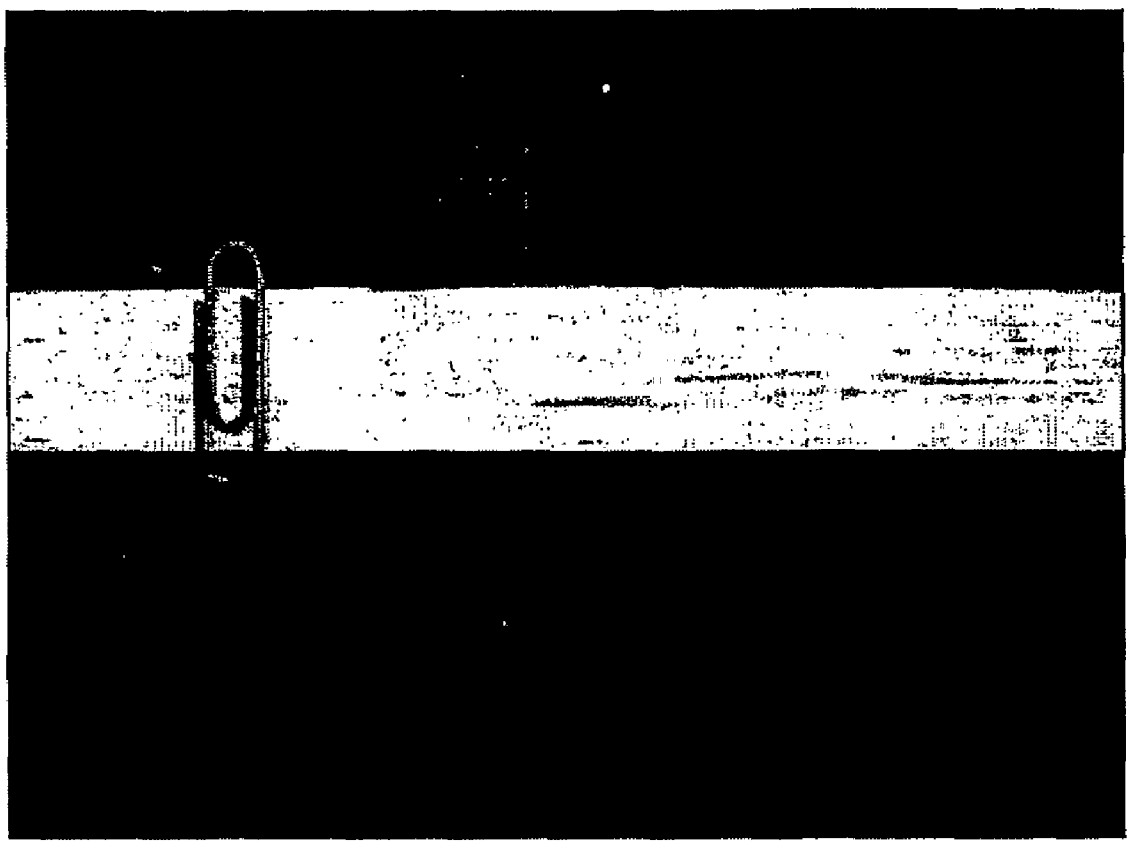
FIG. 3 is a picture of a cross section of low density OSB made with the pre-heated wood furnish as described herein.

FIG. 4 is the view of the cross section of the final product. Although its density is only 30 lb/ft$^3$ (the actual density measured by the QMS density profiler, Model QDP-01X is 29.2 lb/ft$^3$), the sample has displayed a very smooth appearance without any porous areas. FIG. 3 shows the vertical density profile of the product. Unlike the "M" shape commonly seeing in conventional OSB products, the panel has a very flat or homogenous density profile. Table 1 is the testing result of the product. With the density of 30 lb/ft$^3$, the panel has still passed all standard requirements of CSA0437.0-9. The panel has an excellent dimension stability which thickness swelling is only 4.3%.

TABLE 1

Testing results of the low density OSB

| Testing | Units | Requirement O-2 | Direction | Results |
|---|---|---|---|---|
| Modulus of rupture | psi | 4200 | Para | 4430 |
|  |  | 1800 | Perp | 3020 |
| Modulus of elasticity | psi × 1000 | 800 | Para | 919 |
|  |  | 225 | Perp | 300 |
| Internal bond | psi | 50.0 |  | 56.8 |
| Thickness swell |  |  |  |  |
| 24 h soak | % | 10 |  | 4.3 |
| Water Absorption | % | No Req. |  | 21 |

Example 2

Shorter aspen strands having a length within a range of 4-4.5", a width within a range of 0.5-1", and a average thickness of 0.022" were used as the raw material. Eight weight percent of MDI (diphenylmethane diisocyanate) was applied as the binder to these strands as they tumble with the blender by means of a spinning disc. After blending, furnish was hand-formed into a mat similar to the conventional OSB 3-layer orientation. The mat was pre-heated by a microwave oven for 22 seconds until the core temperature in the mat was raised to 55° C. The pre-heated mat then was pressed with the hydraulic press at a temperature of 200° C. for a period of 6 minutes. The target thickness was 0.72 inches and density was 30 lb/ft$^3$. Although its density is only 30 lb/ft$^3$ (the actual density measured by the QMS density profiler, Model QDP-01X is 29.3 lb/ft$^3$), the panel has passed all standard requirements of CSA0437.0-9 as shown in Table 2. FIG. 4 is the vertical density profile of the product in which the "M" shape density profile has been reduced to minimum. The product has a homogeneous density profile.

TABLE 2

Testing results of the low density OSB (short strands)

| Testing | Units | Requirement O-2 | Direction | Results |
|---|---|---|---|---|
| Modulus of rupture | psi | 4200 | Para | 4540 |
|  |  | 1800 | Perp | 2840 |
| Modulus of elasticity | psi × 1000 | 800 | Para | 819 |
|  |  | 225 | Perp | 355 |
| Internal bond | psi | 50.0 |  | 74.7 |
| Thickness swell |  |  |  |  |
| 24 h soak | % | 10 |  | 5.7 |
| Water Absorption | % | No Req. |  | 22.9 |

Example 3

Figure 7:
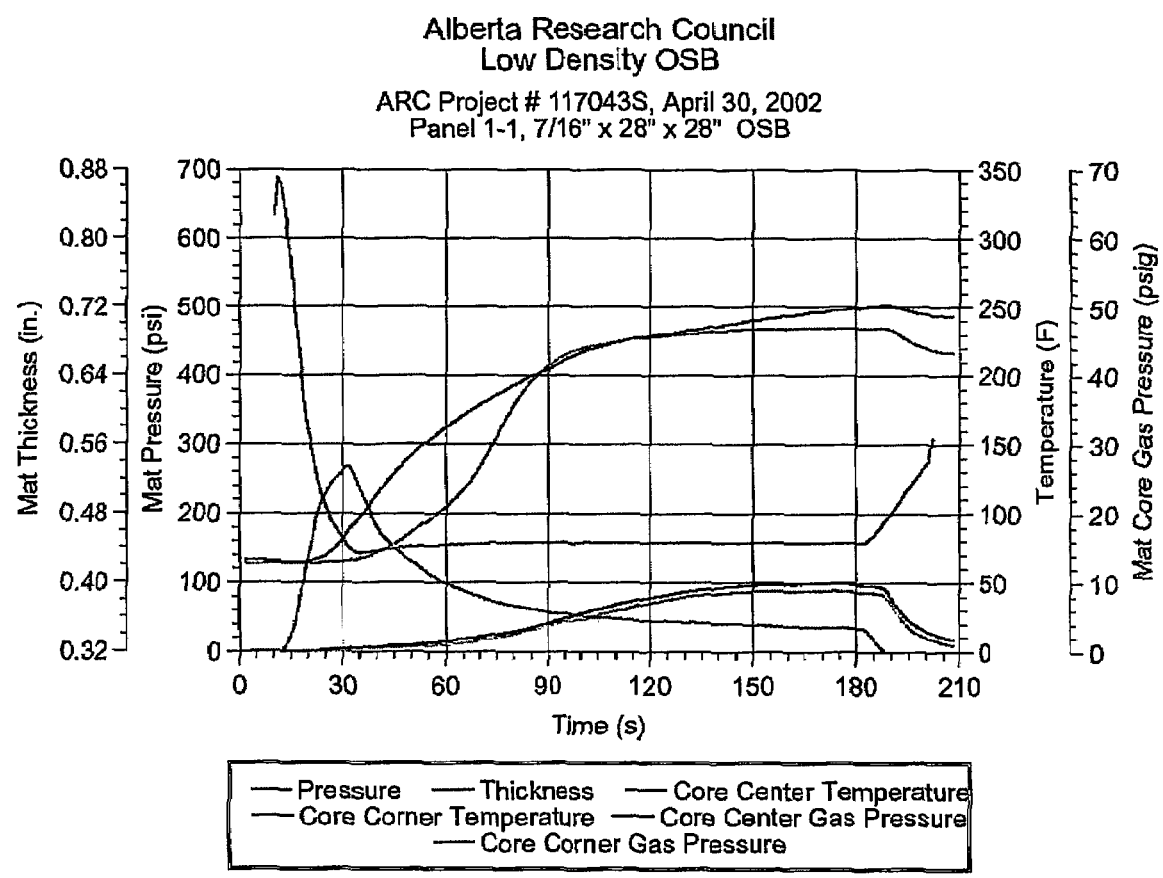
FIG. 7 is an example of a pressing cycle used to produce the low density OSB of FIG. 6.

Aspen strands having a length within a range of 5-5.75", a width within a range of 0.5-1", and a thickness within a range of 0.015"-0.020" were used as the raw material. Seven weight percent of MDI (diphenylmethane diisocyanate) was applied as the binder to these strands when they tumble with the blender by means of a spinning disc. After blending, furnish was formed into the mat similar to conventional OSB 3-layer orientation except that the moisture content of the core furnish was adjusted to 20% while the moisture content of the face furnish was adjusted to 8%. The mat was not pre-heated. The mat then was pressed with the hydraulic press at a temperature of 200° C. for a period of 3 minutes. The thickness of the panel was 0.72 ($^{23}/_{32}$") inches and the average density was targeted at 33 lb/ft$^3$. A similar panel was pressed under similar conditions to a thickness of $^{7}/_{16}$" and an average density of 35 lb/ft$^3$. FIG. 7 shows the pressing cycle conditions for each panel.

FIG. 6 shows the vertical density profile of the products. Unlike the "M" shape commonly seeing in conventional OSB products, the panels have a relatively flat or homogenous density profile. Table 3 includes the testing results of the product. With an average density of 33 lb/ft$^3$ and 35 lb/ft$^3$ respectively, the panels have still passed all standard requirements of CSA0437.0-9. The panels have excellent dimension stability in which thickness swelling is only 6.7% and 4.8% respectively.

TABLE 3

| Group 1 | Units | (0437.1-93) O-2 Requirement | Dir'n | 7/16" | 23/32" |
|---|---|---|---|---|---|
| Modulus of rupture | psi | 4200 | Para | 7620 | 4600 |
|  |  | 1800 | Perp | 4340 | 3420 |
| Modulus of elasticity | psi × 1000 | 800 | Para | 1222 | 991 |
|  |  | 225 | Perp | 396 | 401 |
| Internal bond | psi | 50.0 |  | 98.2 | 45.7 |
| Thickness swell |  |  |  |  |  |
| 24 h soak | % | 10.0 |  | 6.7 | 4.8 |
| Water Absorption | % | No Req. |  | 21.7 | 17.7 |

As will be apparent to those skilled in the art, various modifications, adaptations and variations of the foregoing specific disclosure can be made without departing from the scope of the invention claimed herein.

What is claimed is:

1. A low density OSB having a homogenous vertical density profile.
2. The low density OSB of claim 1 wherein the average density is less than about 40 lb/ft$^3$.
3. The low density OSB of claim 2 wherein the average density is less than about 35 lb/ft$^3$.
4. The low density OSB of claim 3 wherein the average density is about 30 lb/ft$^3$.
5. The low density OSB of claim 1 wherein the lowest core density is greater than about 80% of the highest surface density.
6. The low density OSB of claim 5 wherein the lowest core density is greater than about 85% of the highest surface density.
7. The low density OSB of claim 6 wherein the lowest core density is greater than about 90% of the highest surface density.
8. The low density OSB of claim 1 wherein the average density of the OSB is less than 1.5 times the density of the wood species used in the OSB.
9. The low density OSB of claim 8 wherein the average density of the OSB is less than 1.4 times the density of the wood species used in the OSB.

* * * * *